Patented Dec. 26, 1950

2,535,858

UNITED STATES PATENT OFFICE 2,535,858

2-MERCAPTO-3-AMINO-3,6-DIHYDRO-PYRIMIDINES

Roger A. Mathes and Floyd D. Stewart, Akron, Ohio, assignors to The B. F. Goodrich Company, New York, N. Y., a corporation of New York No Drawing. Application September 13, 1949, Serial No. 115,557

7 Claims. (Cl. 260—256.4)

This invention relates to new and useful organic compounds and pertains particularly to 2-mercapto-3,6-dihydropyrimidines having amino substituents in the 3-position and to a method for preparing these new compounds.

The compounds of this invention are 2-mercapto 3-amino-3,6-dihydropyrimidines having the formula:

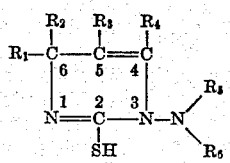

where $R_1$, $R_2$, $R_3$, $R_5$ and $R_6$ are hydrogen or hydrocarbon radicals and $R_4$ is a hydrocarbon radical. They are useful as intermediates in the preparation of medicinals, for example, in the synthesis of certain "sulfa" drugs. Other uses of these compounds as intermediates in the synthesis of organic chemical compounds will be apparent to those skilled in the art. Still other uses for these mercapto amino pyrimidines will be found in the art of insecticides and fungicides and pesticides in general. These mercapto amino pyrimidines also are vulcanization accelerators and accelerator activators and are therefore useful in the vulcanization of rubbery materials.

The 2-mercapto-3-amino pyrimidines can be easily and conveniently prepared by reacting a hydrazine which has the formula

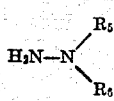

where $R_5$ and $R_6$ are hydrogen or hydrocarbon radicals, with a ketone having a hydrogen atom in the alpha position and a thiocyano group in the beta position to the keto group and being otherwise composed exclusively of carbon and hydrogen atoms (such ketones being hereinafter referred to as beta-thiocyano ketones). During the reaction, water is split out, ring closure occurs, the mercapto amino pyrimidine product precipitates, and is easily obtained in excellent yield.

The above reaction may be represented by the following generic equation:

$$R_1-\underset{\underset{SCN}{|}}{C}-\underset{\underset{H}{|}}{C}-\underset{\underset{O}{\|}}{C}-R_4 + H_2N-\underset{\underset{R_6}{|}}{N}-R_5 \longrightarrow$$

Beta-thiocyano ketone    Hydrazine $$R_1-\underset{\underset{N=C-N-N-R_5}{\underset{|}{SH}\;\;\underset{|}{R_6}}}{\overset{R_2\;\;R_3\;\;R_4}{\underset{|}{C}-\underset{|}{C}=\underset{|}{C}}} + H_2O$$

2-mercapto-3-amino-dihydropyrimidine where $R_1$, $R_2$, $R_3$, $R_4$, $R_5$ and $R_6$ have the significance as stated above.

Any desired beta-thiocyano ketone having the formula as represented in the above equation may be used to prepare the compounds of this invention by the method of this invention. Thus, any or all of $R_1$, $R_2$ and $R_3$ may be hydrogen or any hydrocarbon radical including alkyl, alkenyl, cycloalkyl, aryl, aralkyl and alkaryl radicals as well as other radicals composed of carbon and hydrogen. Similarly, $R_4$ may be any of these hydrocarbon radicals. Beta-thiocyano ketones of this type may be prepared by the reaction of an unsaturated ketone having an olefinic double bond in the alpha-beta position with respect to the keto group, with nascent thiocyanic acid formed by the interaction of a non-oxidizing mineral acid, such as dilute sulfuric acid or hydrochloric acid, with ammonium thiocyanate or an alkali metal thiocyanate. For example, when such alpha-beta unsaturated ketones as mesityl oxide, phorone, butylidene acetone, heptylidene acetone, 5-methyl-4-heptene-one-3, 5-ethyl-3-heptene-one-2, 5-ethyl-3-nonene-one-2, 3-methyl-4-ethyl-3-hexene-one-2, vinyl methyl ketone, vinyl ethyl ketone, acrylophenone, phenyl vinyl ketone, chalcone, acrylonaphthone, benzilidene acetone, 4-phenyl-3-butene-one-2, styryl n-hexyl ketone among others are reacted with thiocyanic acid, the HSCN adds to the double bond of these alpha-beta unsaturated ketones. The resulting products are the beta-thiocyano ketones which are the reactants employed in preparing the 2-mercapto-3-aminodihydropyrimidines of this invention. The preferred beta-thiocyano ketones for use in this invention are those which possess the formula set forth above wherein each of $R_1$, $R_2$ and $R_3$ is hydrogen or an alkyl radical containing from 1 to 6 carbon atoms and $R_4$ is a similar alkyl radical. A typical beta-thiocyano ketone is 4-methyl 4-thiocyanopentan-2-one prepared by the addition of HSCN to mesityl oxide.

The material to be reacted with the beta-thiocyano ketone according to this invention may be hydrazine or any of the hydrocarbon substituted hydrazines represented by the generic formula hereinbefore set forth. For example, this includes such hydrazines as 1-ethyl hydrazine, 1-methyl hydrazine, 1-propyl hydrazine, 1-isopropyl hydrazine, 1-butyl hydrazine, 1-isobutyl hydrazine, 1-sec-butyl hydrazine, 1-amyl hydrazine, 1,1-diethyl hydrazine, 1,1-dimethyl hydrazine, 1,1-diisopropyl hydrazine, 1-ethyl 1-propyl hydrazine, 1-cyclohexyl hydrazine, 1,1-dicyclohexyl hydrazine, 1-methyl-1-cyclohexyl hydrazine, 1-(orthomethyl cyclohexyl) hydrazine, 1-phenyl hydrazine, 1-xylyl hydrazine, 1,1-diphenyl hydrazine, 1-(alpha naphthyl) hydrazine, 1-(beta-naphthyl) hydrazine, 1-(ortho, meta or para tolyl) hydrazine, 1-phenyl 1-para tolyl hydrazine, 1-methyl 1-phenyl hydrazine, 1-ethyl 1-phenyl hydrazine, 1-isoamyl 1-phenyl hydrazine, 1-isobutyl 1-phenyl hydrazine, 1-(2,3-dimethyl phenyl) hydrazine, 1-(2,5-dimethyl phenyl) hydrazine, 1-benzyl 1-(beta naphthyl) hydrazine, 1-benzyl hydrazine, 1-benzylphenyl hydrazine, 1-benzyl 1-phenyl hydrazine, 1-benzyl 1-(ortho, meta or para tolyl) hydrazine, 1-(butyl phenyl) hydrazine, 1-cyclohexyl 1-phenyl hydrazine, 1-cyclohexyl 1-(ortho, meta or para tolyl) hydrazine, 1,1-dibenzyl hydrazine, 1-(ortho-ethyl phenyl) hydrazine, 1-hexyl 1-phenyl hydrazine, 1-(para-methyl butyl phenyl) hydrazine, 1-(para-3-methyl cyclohexyl phenyl) hydrazine, 1-methyl 1-(methylcyclohexyl phenyl) hydrazine, 1-methyl 1-phenyl hydrazine, 1,1(2,3-naphthyl)-bis(triphenyl methyl) hydrazine, 1-phenethyl-1-phenyl hydrazine, 1-phenyl 1-propyl hydrazine, 1-(triphenyl methyl) hydrazine, among others as reactants.

In carrying out the preparation of 2-mercapto-3-amino-3,6-dihydropyrimidines the reactants are brought together in any desired manner. Preferably the reactants are stirred together in the presence of an inert reaction diluent. Such solvents and diluents as water, ether, alcohol, benzene, hexene among others may be used. It is not necessary to employ a reaction diluent, for the desired reaction will take place when the reactants are merely combined and heated as herein described. But the use of a diluent or solvent facilitates processing and hence is desirable.

In general, heating the reaction mixture to a temperature of about 100° C. in most cases is desirable. When the reaction is carried out at atmospheric pressure maintaining the reaction temperature in the range of 50° C. to 100° C. will give the best results. But the reaction will begin at room temperature or below with a spontaneous rise in temperature because of the exothermic nature of the reaction. The pressure at which the reaction is carried out may be varied as desired, but, in general, it will be found that the reaction is most conveniently carried out at atmospheric pressure. In this case, standard acid-resistant reaction equipment is used.

It is also preferred to carry out the reaction in an acidic reaction medium. This may be accomplished by adding to the reaction mixture a small amount of a mineral acid such as sulfuric acid or hydrochloric acid as a dilute solution; that is, about a 0.01 molar solution. Under these conditions, the reaction and the subsequent ring closure takes place more rapidly than when the reaction medium is neutral or basic. It is not critical that the reaction medium be acidic for the reaction and ring closure will take place in a neutral medium. When crude beta-thiocyano ketone is obtained by the reaction hereinbefore described, it is sufficiently acid so that the addition of an acid or acidic material is not necessary to increase the rate of reaction and ring closure. Hence, purified beta-cyano ketone, one which has been washed with water to remove by-product salts and residual acid, is not sufficiently acidic to cause the reaction to proceed at the most desirable rate.

The following specific examples are merely illustrative of our invention and are not intended to be a limitation thereon. The precise proportions in the examples are not critical and the amounts of the reactants employed may be varied in keeping with the best operational practices. In each of the examples the parts are by weight.

EXAMPLE I

A mixture consisting of 39.3 parts of washed and purified 4-methyl-4-thiocyano-pentan-2-one, 2 parts of dilute (0.01 molar) sulfuric acid and 50 parts of water were placed in an acid resistant reaction vessel. While stirring this mixture, an aqueous solution containing 12.69 parts of unsubstituted hydrazine monohydrate and 50 parts of water was slowly added to the mixture. The temperature of the reaction mixture rose from room temperature to about 56° C. The reaction mixture was then heated to 80° C. and a white precipitate formed. After cooling the resulting slurry to room temperature, the precipitate was recovered by filtration and dried. In this manner 34 parts, an 85% yield, of a white solid were recovered. After recrystallizing the solid from ethanol, the purified product had a melting point of 209° C. to 210° C. This purified product was analyzed for carbon, hydrogen, nitrogen and sulfur. The percentage composition as determined by analysis agreed closely with the percentage composition calculated for the desired product, 2 - mercapto - 3 - amino - 4,6,6 - trimethyl-3,6-dihydropyrimidine.

*Percent composition of the product*

| Calculated | By Analysis |
|---|---|
| C 49.09 | C 49.11 |
| H 7.65 | H 7.70 |
| N 24.54 | N 24.57 |
| S 18.72 | S 18.65 |
| M. W. 171.3 | M. W. 172 |

Hence, the above product was 2-mercapto-3-amino - 4,6,6 - trimethyl - 3,6-dihydropyrimidine which has the formula:

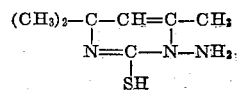

EXAMPLE II

A mixture consisting of 39.3 parts of 4-methyl-4-thiocyano-pentan-2-one (crude) and 125 parts of water was stirred while 29.7 parts of phenyl hydrazine were slowly added and the reaction temperature rose from about 25° C. to 48° C. The stirring of the mixture was continued while the reaction mixture was heated to and maintained at a temperature between 85° C. and 90° C. for 2 hours. During this time a viscous oily material formed which solidified to a resinous substance after it was recovered from the reaction medium and allowed to cool. A yield of 95% of this resinous material was recovered. After recrystallizing the product from benzene, the purified product had a melting point of 170–171° C. and had the following chemical composition which agrees with the percentage composition for the desired product, 2-mercapto-3-anilino-4,6,6-trimethyl-3,6-dihydropyrimidine.

*Percentage composition*

| Calculated | By Analysis |
|---|---|
| C 63.12 | C 63.33 |
| H 6.93 | H 6.93 |
| N 16.99 | N 16.73 |

Hence, the product was 2-mercapto-3-anilino-4,6,6-trimethyl-3,6-dihydropyrimidine which has the formula:

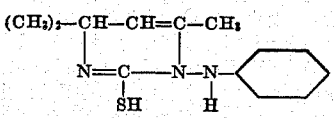

EXAMPLES III TO IX

The examples which follow illustrate the use of beta-thiocyano ketones other than 4-methyl-4-thiocyanopentan-2-one in preparing these 3-amino substituted 2-mercaptopyrimidines. In each of these examples hydrazine is used as a reactant with these other thiocyano ketones in order to simplify the illustrations. It will be understood that any of the other hydrazines hereinbefore set forth can also be used. The reactants used and the products obtained are as follows:

| Example | Beta-Thiocyano Ketone Used | Product |
|---|---|---|
| III | $(C_2H_5)_2$—CH—CH—CH$_2$—C(=O)—CH$_3$<br>                    SCN<br>5-ethyl-4-thiocyanoheptan-2-one<br>(From 5-ethyl-3-heptene-2-one+HSCN) | $(C_2H_5)_2$—CH—C—CH=C—CH$_3$<br>           N=C——N—NH$_2$<br>              SH<br>2-mercapto-3-amino-4-methyl-6(1-ethyl-propyl)-dihydropyrimidine |
| IV | $C_4H_9$—CH——CH—CH$_2$—C(=O)—CH$_3$<br>        $C_2H_5$   SCN<br>5-ethyl-4-thiocyanononan-2-one<br>(From 5-ethyl-3-nonene-2-one+HSCN) | $C_2H_5$<br>$C_4H_9$—CH—CH—CH=C—CH$_3$<br>         N=C——N—NH$_2$<br>           SH<br>2-mercapto-3-amino-4-methyl-6(1-ethyl-amyl)-dihydropyrimidine |
| V | $C_5H_{11}$—CH—CH$_2$—C(=O)—CH$_3$<br>        SCN<br>4-thiocyanononan-2-one<br>(From 3-nonene-2-one+HSCN) | $C_5H_{11}$—CH—CH=C—CH$_3$<br>       N=C——N—NH$_2$<br>         SH<br>2-mercapto-3-amino-4-methyl-6-amyl-dihydropyrimidine |
| VI | $C_3H_7$—CH—CH$_2$—C(=O)—CH$_3$<br>      SCN<br>4-thiocyano-heptan-2-one<br>(From butylidene acetone+HSCN) | $C_3H_7$—CH—CH=C—CH$_3$<br>     N=C——N—NH$_2$<br>       SH<br>2-mercapto-3-amino-4-methyl-6-propyl-dihydropyrimidine |
| VII | $CH_3$—CH$_2$—C(=O)—CH$_3$<br>     SCN<br>4-thiocyano-butan-2-one<br>(From vinyl methyl ketone+HSCN) | $H_3C$—CH=C—CH$_3$<br>    N=C——N—NH$_2$<br>     SH<br>2-mercapto-3-amino-4-methyl-dihydropyrimidine |
| VIII | $CH_3$—CH$_2$—C(=O)—$C_2H_5$<br>     SCN<br>5-thiocyano-heptan-3-one<br>(From vinyl ethyl ketone+HSCN) | $CH_3$—CH=C—$C_2H_5$<br>   N=C——N—NH$_2$<br>     SH<br>2-mercapto-3-amino-4-ethyl-dihydropyrimidine |
| IX | ⌬—CH—CH$_2$—C(=O)—$C_4H_9$<br>    SCN<br>(2-phenyl-2-thiocyanoethyl) butyl ketone<br>(From styryl n-butyl ketone+HSCN) | ⌬—CH—CH=C—$C_4H_9$<br>   N=C——N—NH$_2$<br>    SH<br>2-mercapto-3-amino-4-n-butyl-6-phenyl-dihydropyrimidine |

Having disclosed our invention by way of specific examples which are intended merely to be illustrative of our process and the products obtained thereby and which are not to be construed as limitations thereon, we do not desire nor intend to limit ourselves solely thereto, for it will be apparent to those skilled in the art that the proportions of the materials utilized, and the time and temperature of reaction may be varied and other materials having equivalent chemical and physical properties may be employed, if desired, without departing from the spirit and scope of our invention as defined in the appended claims.

We claim:

1. A 2-mercapto-3-amino-3,6-dihydropyrimidine having the formula

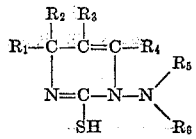

where $R_1$, $R_2$, $R_3$, $R_5$ and $R_6$ are members of the class consisting of hydrogen and saturated aliphatic and aromatic hydrocarbon radicals and $R_4$ is a hydrocarbon radical selected from the class consisting of saturated aliphatic hydrocarbon and aromatic hydrocarbon radicals.

2. 2-mercapto-3-amino-4,6,6-trimethyl-3,6-dihydropyrimidine having the formula

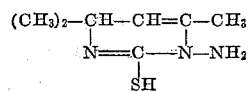

3. 2-mercapto-3-anilino-4,6,6-trimethyl-3,6-dihydropyrimidine having the formula

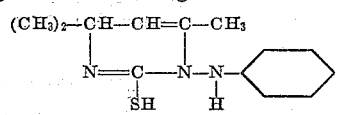

4. The process which comprises reacting a beta-thiocyano ketone of the formula

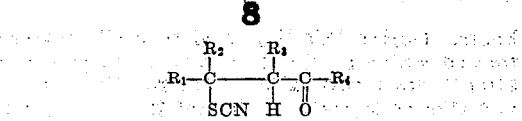

wherein $R_1$, $R_2$, $R_3$ are selected from the group consisting of hydrogen and saturated aliphatic hydrocarbon and aromatic hydrocarbon radicals and $R_4$ is a radical selected from the group consisting of saturated aliphatic hydrocarbon and aromatic hydrocarbon radicals, with a hydrazine of the formula

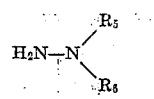

wherein $R_5$ and $R_6$ are members of the class consisting of hydrogen and saturated aliphatic hydrocarbon and aromatic hydrocarbon radicals, thereby to produce a compound of the formula

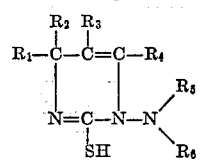

wherein $R_1$, $R_2$, $R_3$, $R_4$, $R_5$ and $R_6$ have the same meaning as set forth hereinabove.

5. The process of claim 4 wherein the reaction is effected in an acidic aqueous medium.

6. The process of preparing 2-mercapto-3-amino-4,6,6-trimethyl-3,6-dihydropyrimidine which comprises reacting 4-methyl-4-thiocyanopentan-2-one with unsubstituted hydrazine.

7. The process of preparing 2-mercapto-3-anilino-4,6,6-trimethyl-3,6-dihydropyrimidine which comprises reacting 4-methyl-4-thiocyanopentan-2-one with phenyl hydrazine.

ROGER A. MATHES.
FLOYD D. STEWART.

No references cited.